(12) United States Patent
Stilwell (10) Patent No.: US 11,077,548 B2
(45) Date of Patent: Aug. 3, 2021

(54) SUBROUTINE ALLOCATION FOR ROBOTIC COLLABORATION

(71) Applicant: Stilwell Technology and Robotics, LLC, Brandy Station, VA (US)

(72) Inventor: Wayne P. Stilwell, Manassas, VA (US)

(73) Assignee: Stilwell Technology and Robotics, LLC, Brandy Station, VA (US)

( * ) Notice: Subject to any disclaimer, the term of this patent is extended or adjusted under 35 U.S.C. 154(b) by 0 days.

(21) Appl. No.: 16/589,389

(22) Filed: Oct. 1, 2019

(65) Prior Publication Data
US 2020/0030965 A1 Jan. 30, 2020

Related U.S. Application Data

(63) Continuation of application No. 15/599,248, filed on May 18, 2017, now Pat. No. 10,500,717.
(Continued)

(51) Int. Cl.
*G05D 1/00* (2006.01)
*B25J 9/00* (2006.01)
(Continued)

(52) U.S. Cl.
CPC ............ *B25J 9/0084* (2013.01); *B25J 9/162* (2013.01); *B25J 9/1682* (2013.01);
(Continued)

(58) Field of Classification Search
CPC ............ G05D 1/02191; G05D 1/0293; G05D 2201/0216; Y10S 901/01
(Continued)

(56) References Cited

U.S. PATENT DOCUMENTS 6,374,155 B1   4/2002   Wallach et al.
6,833,842 B2  12/2004   Keeley
(Continued)

FOREIGN PATENT DOCUMENTS

WO   WO-2009040777 A2   4/2009

OTHER PUBLICATIONS

Murphy, Mike "Google has patented the ability to control a robot army" https://qz.com/383275/google-has-patented-the-ability-to-control-a-robot-army/; Apr. 14, 2015.
(Continued)

*Primary Examiner* — Dalena Tran
(74) *Attorney, Agent, or Firm* — Mei & Mark, LLP (57) ABSTRACT

A method of robotic collaboration comprises designating a first robot a lead robot and assigning a first task in a task area to the lead robot. Broadcasting a work query in the task area seeks the presence of subordinate robots configured to perform tasks. Receiving a work confirmation signal from a subordinate robot in the task area answers the work query with an affirmation that the subordinate robot is in the task area to perform tasks. Transmitting a task command to the subordinate robot in response to the work confirmation signal comprises a directive to perform the first task. Receiving a task confirmation signal informs the lead robot of the subordinate robot electronic characteristics comprising processing capabilities, transmit signal profile, receive signal profile, and storage device capabilities. Processing confirms whether the subordinate robot can collaborate with the lead robot to do the first task.

20 Claims, 8 Drawing Sheets

Related U.S. Application Data (60) Provisional application No. 62/445,055, filed on Jan. 11, 2017.

(51) Int. Cl.
  *B25J 9/16* (2006.01)
  *G05D 1/02* (2020.01)

(52) U.S. Cl.
  CPC . *G05D 1/0295* (2013.01); *G05B 2219/25347* (2013.01); *G05B 2219/39146* (2013.01)

(58) Field of Classification Search
  USPC .......... 700/245, 248, 264; 318/568.11, 568.2
  See application file for complete search history.

(56) References Cited

U.S. PATENT DOCUMENTS

| | | | |
|---|---|---|---|
| 7,009,610 B1 | 3/2006 | Keeley | |
| 7,039,623 B1 | 5/2006 | Keeley | |
| 7,117,067 B2 * | 10/2006 | McLurkin | G05D 1/0297 |
| | | | 700/245 |
| 7,159,208 B2 | 1/2007 | Keeley | |
| 7,512,581 B2 | 3/2009 | Keeley et al. | |
| 7,685,528 B2 | 3/2010 | Keeley et al. | |
| 8,428,777 B1 | 4/2013 | Poursohi et al. | |
| 8,548,627 B2 * | 10/2013 | Ulmer | G05B 19/4186 |
| | | | 700/246 |
| 9,008,839 B1 | 4/2015 | Kuffner, Jr. et al. | |
| 9,821,455 B1 * | 11/2017 | Bareddy | B25J 9/0084 |
| 2014/0289170 A1 | 9/2014 | Keeley | |

OTHER PUBLICATIONS

Stilwell, Wayne Piney, "A Calibration and Validation Process (CAVP) for Complex Adaptive System Simulations", Dissertation presented to University of Virginia, Sep. 7, 2006; pp. 1-155.

Stilwell, Wayne, "A Calibration and Validation Process (CAVP) for Complex Adaptive System Simulation", Presented at University of Virginia on Sep. 7, 2006. pp. 1-26.

* cited by examiner

SUBROUTINE ALLOCATION FOR ROBOTIC COLLABORATION

This is a continuation of application Ser. No. 15/599,248, filed May 18, 2017 which claims the benefit of U.S. provisional patent application No. 62/445,055 filed Jan. 11, 2017 all of which are incorporated herein by reference.

FIELD

This application relates to robotic control, robotic collaboration and interfaces therefor.

BACKGROUND

Prior robot control techniques for teams of robots result in a "swarm" of robots with redundant programming and objectives. The robots resemble a swarm of bugs crawling over each other to perform their respective tasks. It has been difficult to package a robotics system such that the robots are aware of each other and their relationship to their assigned task.

SUMMARY

The methods disclosed herein overcome the above disadvantages and improves the art by way of robotic interfaces for robotic control and collaboration.

A method of robotic collaboration, comprising designating a first robot a lead robot and assigning a first task in a task area to the lead robot. Broadcasting, from the lead robot, a work query in the task area seeks the presence of subordinate robots configured to perform tasks. Receiving, at the lead robot, a work confirmation signal from a subordinate robot in the task area answers the work query with an affirmation that the subordinate robot is in the task area to perform tasks. Transmitting, from the lead robot, a task command to the subordinate robot in response to the work confirmation signal comprises a directive to perform the first task. Receiving at the lead robot, from the subordinate robot, a task confirmation signal comprising first data confirming the subordinate robot physical characteristics and second data confirming the subordinate robot electronic characteristics informs the lead robot of the subordinate robot electronic characteristics comprising processing capabilities, transmit signal profile, receive signal profile, and storage device capabilities. Processing the received first data and the received second data confirms whether the subordinate robot can collaborate with the lead robot to do the first task. The lead robot or the subordinate robot completes at least a portion of the first task.

Another method of robotic collaboration comprises designating a first robot a lead robot and assigning a first task in a task area to the lead robot. Broadcasting, from the lead robot, a processing capabilities query in the task area seeks processing capabilities of a subordinate robot in the task area. Receiving, at the lead robot, a processing capabilities confirmation signal from the subordinate robot in the task area informs the lead robot of subordinate robot processing characteristics. Broadcasting, from the lead robot, a work query to the subordinate robot, and receiving, at the lead robot, a work confirmation signal from the subordinate robot, answers the work query with an affirmation that the subordinate robot is in the task area to perform the task. Transmitting, from the lead robot, a task command to the subordinate robot in response to the work confirmation signal, comprises a directive to perform the first task. Receiving at the lead robot, from the subordinate robot, a task confirmation signal comprises first data confirming the subordinate robot physical characteristics and second data confirming the subordinate robot electronic characteristics. Processing the received first data and the received second data confirms whether the subordinate robot can collaborate with the lead robot to do the first task. One or both of the lead robot and the subordinate robot complete at least a portion of the first task.

The methods can further comprise transmitting formatting algorithms from the lead robot to the subordinate robot in response to the processing capabilities confirmation signal, the formatting algorithms configured to format the processing capabilities of the subordinate robot to complete the first task.

Additional objects and advantages will be set forth in part in the description which follows, and in part will be obvious from the description, or may be learned by practice of the disclosure.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Robotics collaboration permits a disciplined team of robots to function in an organized, network-aware manner. Instead of "swarming" to reach an objective, the robots are aware of other network members and adjust their actions based on the presence and attributes of other squad members. The robots are also self-aware, with capability to sense and respond to their surroundings.

Figure 1:
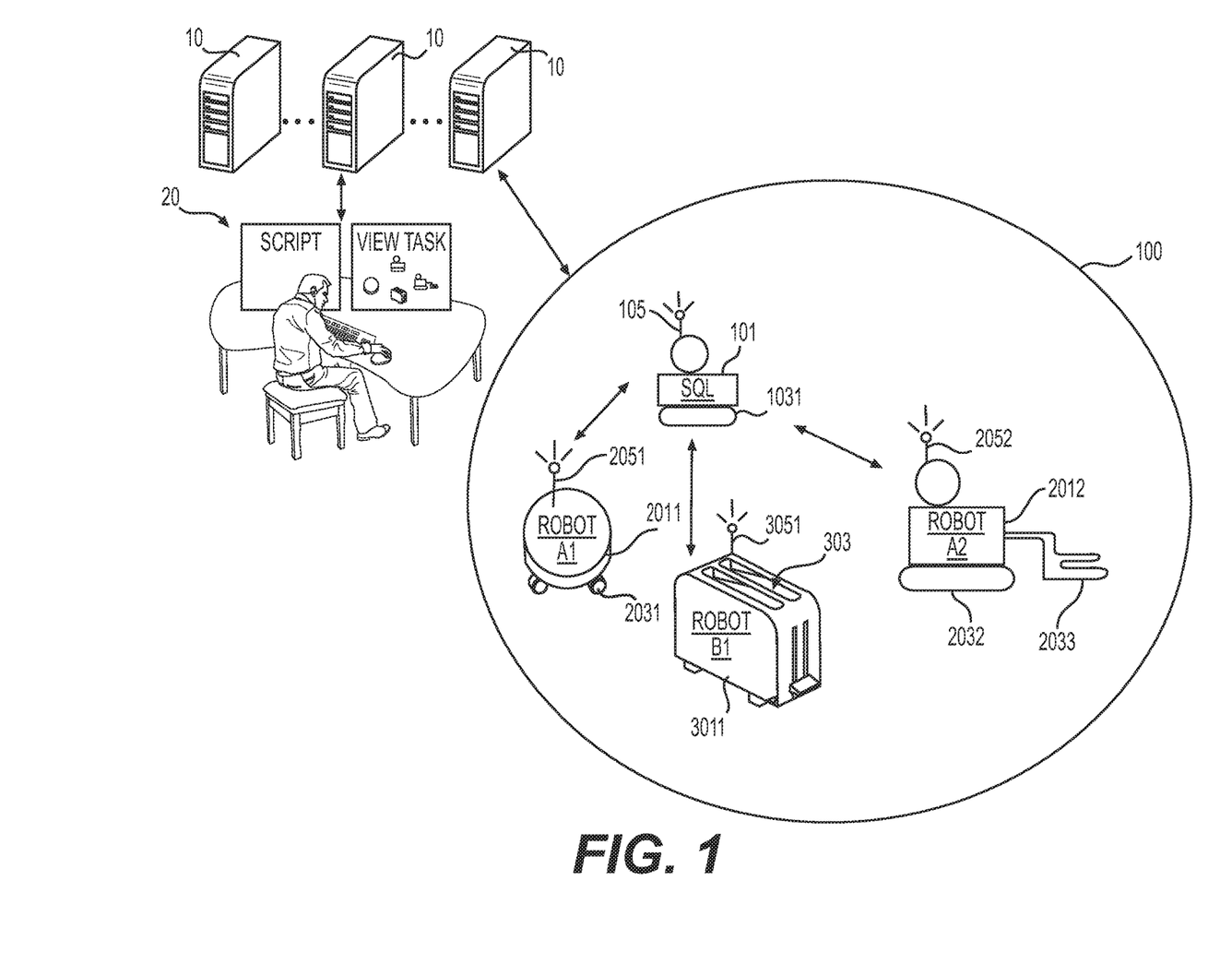
FIG. 1 is a schematic representation of human-on-the-loop oversight of a squad network.

FIG. 1 is a schematic representation of human-on-the-loop (HOL) oversight of a task area 100. A HOL assembly 20 can comprise mechanisms for permitting a human to input required scripts for designating a lead robot in step 400 and assigning a task in step 401. Additional scripts, such as those needed for weighting physical characteristics and electronic characteristics in step 507, optimizing robot use in step 519, adjusting task commands 521, and generating new task completion algorithms, among others, can be input via input devices at HOL assembly 20. For example, keyboard, mouse, synaptic devices, USB or other data ports, among others, permit insertion of scripts to modify the robots and control algorithms comprising the squad network.

Viewing, processing, and storage devices are also included in the HOL assembly. For example, monitors, printers, hand-held devices, among others can be associated with one or more processing devices and storage devices. Computer-readable media, such as RAM, ROM, USB among others can comprise storage devices for necessary algorithms, including scripts. The processor of the HOL assembly 20 can access the computer readable media to execute the stored algorithms. One or more libraries 10 of algorithms can be accessed via cloud-computing, virtual private network (VPN), private network, or other hardwired or internet capabilities.

A task area 100 is viewable at the HOL assembly 20 for oversight. The robots are subject to a leadership hierarchy resulting in a squad-based robot hierarchy. At least one robot is a center "hub" for mission directives, network mapping, and subroutine allocation. The lead robot, or squad leader robot SQL, can have enhanced hardware, such as more memory device capacity, stronger networking signal strength capacity, and faster processing speed, while lower hierarchy robots have reduced capacities. The hierarchy structure permits lighter, less complex squad members that can act faster than more complicated prior art swarms via the reduced processing load to individuals in the network. Individual robots, or squad members, are "spokes," receiving distributed commands, subroutine updates, task provisioning, etc. from the squad leader robot SQL.

A squad leader can push the commands, updates, and provisioning, can track squad network progress, and can update the pushed commands, pushed updates, and provisioning based on the progress. Meanwhile, the squad members can receive the various pushed data. While aggregation of pushed data is permissible, it is possible for the squad members to replace a prior iteration of commands, subroutines, and provisioning with the updated push. The "flushing" of old data and replacement with new data simplifies the squad member operation resulting in faster response times and less complex hardware for the squad members.

In FIG. 1, the squad leader robot SQL comprises physical characteristics and electronic characteristics. A main body 101 contains processing capabilities, such as a processor, memory device, and stored processor-executable algorithms. In this example, the squad leader robot SQL comprises caterpillar treads 1031 as one of its physical characteristics associated with main body 101. A transmit and receive device 105, such as a two-way radio antenna, is affixed to main body 101 and can transmit and receive signals related to HOL assembly 20 and related to the other robots in the task area 100.

Other robots in the task area 100 also comprise their own physical characteristics and electronic characteristics. For example, robot A1 can comprise a transmit and receive device 2051, and its processing capabilities can be contained in a main body 2011 that also comprises caster wheels 2031 for physical characteristics. Robot B1 can comprise a transmit and receive device 3051, and its main body 3011 can comprise processing capabilities and physical characteristics 3031 comprising a toaster function. Robot A2 can comprise transmit and receive device 2052, and its main body 2012 can comprise processing capabilities. Physical characteristics of robot A2 can comprise caterpillar treads 2032 and a forklift 2033.

Squad leader robot SQL can communicate bi-directionally with HOL assembly 20 and each of robots A1, A2, & B1. As indicated by the double-headed arrows to task area 100, bidirectional communication is possible between HOL assembly 20 and all robots (SQL, A1, A2, B1) in the task area. It is preferable to limit chatter by restricting bi-directional communication to squad leader robot SQL and HOL assembly 20. In some instances, it is advantageous for HOL assembly 20 to communicate bi-directionally with the other robots (A1, A2, B1). In any case, communications can be transmitted across a meshed network. In the alternative, the communications can be point to point, or point to multipoint.

Figure 4A:
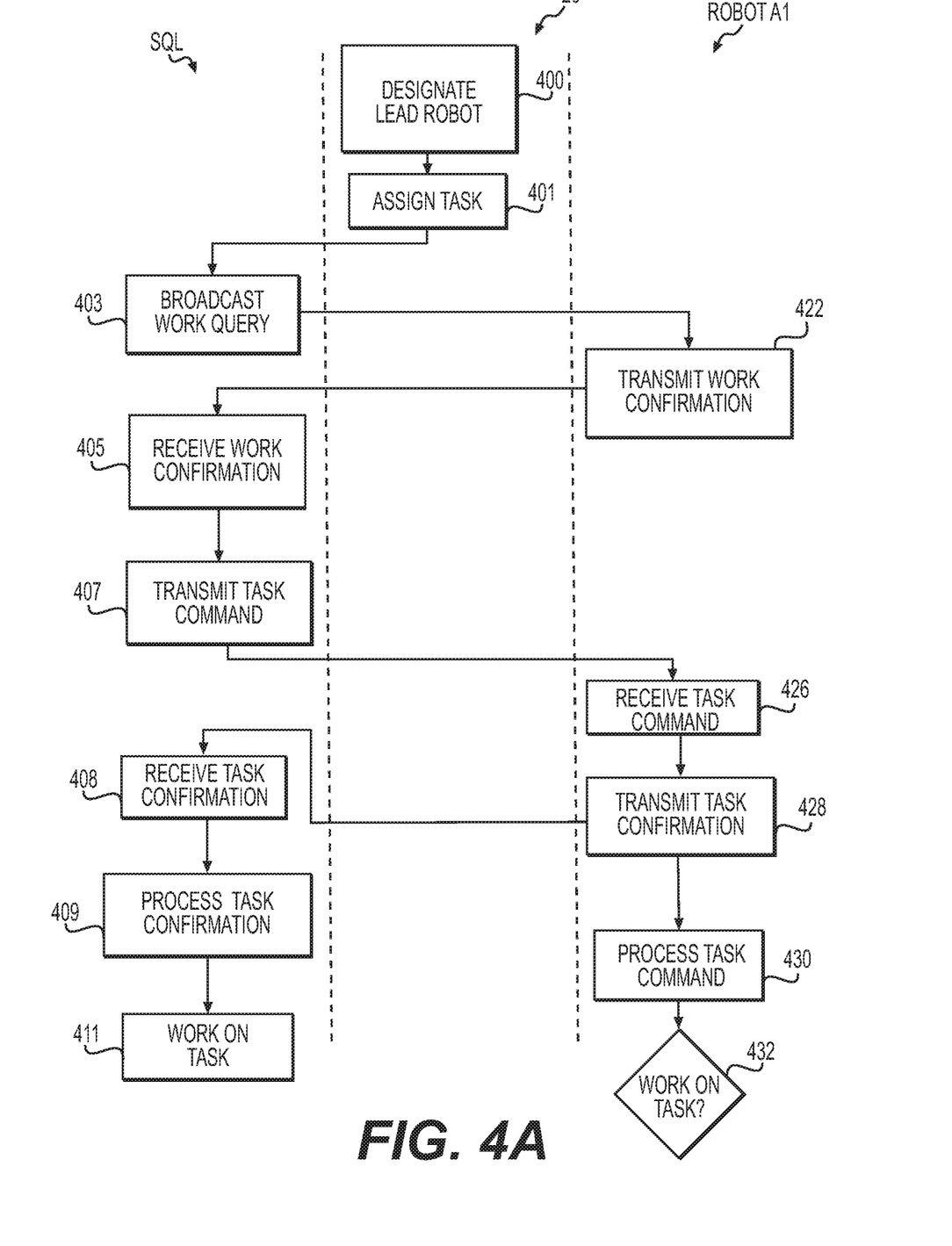
FIGS. 4A-4B are alternative methods for completing a task.

A method of robotic collaboration is outlined in FIG. 4A and comprises designating a first robot a lead robot in step 400. This can be done by a human via HOL assembly 20, or algorithms discussed more below can be implemented onboard a current squad leader robot SQL or can be implemented at the HOL assembly 20 for result in lead robot designation. FIG. 4 illustrates the designation emanating from HOL assembly 20. HOL assembly 20 also assigns a task in step 401, either via automation programming or via human selection. The task is assigned in a task area 100 to the lead robot, who is also known as the squad leader robot SQL. The method progresses with broadcasting, from the lead robot, a work query in the task area in step 403. This seeks the presence of subordinate robots configured to perform tasks. In the example, robot A1 receives the broadcast and, in step 422, robot A1 transmits a work confirmation signal. The lead robot receives the work confirmation signal from the subordinate robot in the task area in step 405. This answers the work query with an affirmation that a subordinate robot is in the task area to perform tasks.

The lead robot then transmits a task command to the subordinate robot in response to the work confirmation signal in step 407. The task command can comprise a directive to perform the first assigned task. By not transmitting the task command until after the work confirmation signal is received, the lead robot does not waste resources broadcasting task commands. This reserves energy, reduces chatter, and speeds overall system processing. The uncluttered broadcasts also make it easier to work with robots of lower processing capabilities, thus expanding the applicability and backwards-compatibility of the disclosed techniques.

The subordinate robot receives the task command in step 426 and implements processing to transmit a task confirmation signal in step 428. The task confirmation signal comprises first data confirming the subordinate robot physical characteristics and second data confirming the subordinate robot electronic characteristics. In consideration of robot A1, the example robot, this means that physical characteristics 2031 are part of the task confirmation signal, and so are processing capabilities 2011.

Next, the lead robot receives, from the subordinate robot, the task confirmation signal 408. This informs the lead robot at least of the subordinate robot electronic characteristics comprising processing capabilities, transmit signal profile, receive signal profile, and storage device capabilities. The lead robot processes the received first data and the received second data in step 409. This processing can be used to confirm whether the subordinate robot can collaborate with the lead robot to do the first task. The lead robot can work on the task in step 411 to complete at least a portion of the first task. Or, commensurate with other embodiments, the lead robot can move on to other tasks while the subordinate robot completes the task. Or, the lead robot and subordinate robot can work on the task together.

Once the subordinate robot assembles and transmits the task confirmation signal in step 428, the subordinate robot can further process the task command in step 430. Step 430 can comprise aspects of FIGS. 4B, 6 & 7. Ultimately, a decision is made whether or not to work on the task in decision block 432.

Figure 2:
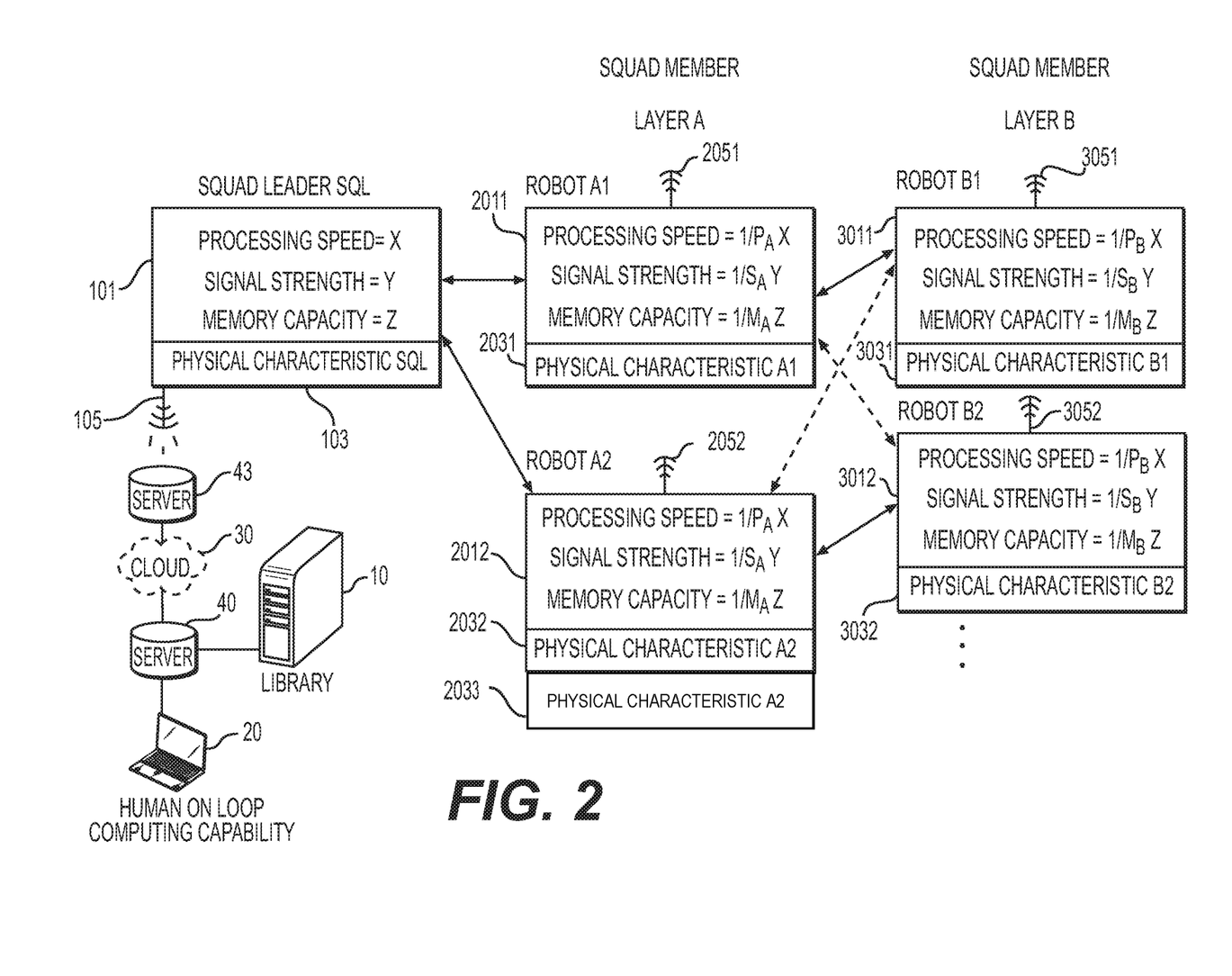
FIG. 2 is a flow diagram of squad network capabilities.

FIG. 2 shows one example where the squad leader robot SQL processing capacity 101 is at full strength for processing speed X, signal strength Y, and memory capacity Z. The squad members in the next layer in the hierarchy, layer A, comprises Robots A1, A2, . . . . One or more layer A robots can have equal capacity to the squad leader robot SQL while other squad member robots can have a fraction of the processing capacity, as shown. When layer A robots comprise fractional capacity, the processing speed X can be fractionally reduced by $1/P_A$, signal strength Y can be fractionally reduced by $1/S_A$, and memory capacity Z can be fractionally reduced by $1/M_A$. Should the squad leader be disabled, a layer A robot with equal processing capacity can be appointed the squad leader, or, the next-best layer A robot can be selected. Or, a subset or aggregate of layer A robots can be used to regenerate squad leader robot SQL processing capacity. Allocation programming permits robots A1, A2, . . . to combine capabilities to meet squad leader robot SQP processing capacity, for example, $1/P_A+1/P_A=X$, $1/S_A+1/S_A=Y$, $1/M_A+1/M_A=Z$. In another alternative, the squad leader can allocate processing or other functionality to Layer A robots to offload work and free up squad leader processing capacity 101. The allocation augments the squad leader robots SQL's network awareness capacity.

Similarly for Layer B, the next layer in the hierarchy, robots B1, B2, . . . one or more layer B robots can have equal capacity to the squad leader robot SQL while other robots can have reduced capacity as shown. The processing speed X can be fractionally reduced by $1/P_B$, signal strength Y can be fractionally reduced by $1/S_B$, and memory capacity Z can be fractionally reduced by $1/M_B$. Should the squad leader robot SQL and or Layer A robots A1, A2, . . . be disabled, a layer B robot with equal capacity can be appointed the squad leader robot SQL, or, a subset or aggregate of layer B robots can be used to regenerate squad leader robot SQL processing capacity. Allocation programming permits robots B1, B2, . . . to combine capabilities to meet squad leader robot SQL processing capacity, for example, $1/P_B+1/P_B=X$, $1/S_B+1/S_B=Y$, $1/M_B+1/M_B=Z$. In an alternative, allocation programming permits robots B1, B2, . . . to combine capabilities to meet Layer A robot capacities, for example, $1/P_B+1/P_B=1/P_AX$, $1/S_B+1/S_B=1/S_AY$, $1/M_B+1/M_B=1/M_AZ$. In another alternative, the squad leader can allocate processing or other functionality to Layer B robots to offload work and free up squad leader robot SQL processing capacity. The allocation augments the squad leader robot SQL's network awareness capacity.

It is not necessary that all robots in a squad network be homogeneous with respect to physical or processing capabilities. It is possible to assemble heterogeneous devices in to a squad network. Each of the lead robot, the first subordinate robot A1, a second subordinate robot A2, etc. can be heterogeneous with respect to electronic characteristics. But, the lead robot is configured to interface among the heterogeneous electronic characteristics. A method can be implemented so that the lead robot issues heterogeneous task completion algorithms to the first subordinate robot A1 and to the second subordinate robot A2, and the heterogeneous task completion algorithms are respectively tailored to the electronic characteristics of the first subordinate robot A1 and of the second subordinate robot A2. For example, the first subordinate robot A1 can be of such limited memory capacity Z that the first subordinate robot requires streaming of task commands. However, second subordinate robot A2 can comprise a high memory capacity Z that permits downloading and storage of task commands. Or, transmission rates of task commands can be tailored to the processing speeds, or the signal strength of the transmissions can be tailored to the antenna types involved, and the like.

Likewise, each of the lead robot, the subordinate robot, and the second subordinate robot can be heterogeneous with respect to physical characteristics. The lead robot can be configured to interface among the heterogeneous physical characteristics. Then, the lead robot can issue heterogeneous task completion algorithms to the first subordinate robot A1 and to the second subordinate robot A2. The heterogeneous task completion algorithms are respectively tailored to the physical characteristics of the first subordinate robot A1 and of the second subordinate robot A2. For example, robot A1 can move on a different turning radius than robot A2, and so first subordinate robot A1 can receive different instructions for pivoting than second subordinate robot A2.

It is possible that the first task commands and the second task commands are heterogeneous so that a step of subdividing the task command in to first task commands and second task commands to allocate robotic collaboration based on the determined relative task completion capabilities comprises minimizing redundancies between the subordinate robot and the second subordinate robot. This is especially useful to avoid a "swarm" or robots one over the other.

Also shown in FIG. 2 is an alternative connection to HOL assembly 20. Hardware for HOL assembly comprises a laptop or notebook computer connected to a server 40. The server 40 connects to a library 10 of algorithms. An internet cloud 30 transfers data between servers 40 & 43. Transmit and receive devices 105, 2051, 2052, 3051, 3052 can be networked to communicate directly or indirectly with server 43, such as by WI-FI or other routing capabilities.

Leadership is adaptive based on situational programming, for example, leadership can be reallocated to another squad member based on whether the lead robot, for example, malfunctions or otherwise lacks leadership capability. Should a squad leader robot SQL be removed from the squad network, allocation processing among the squad members A1, A2, B1, B2, . . . can permit the lesser processing capacity of the squad members to be aggregated to meet the minimum processing requirements that a squad leader robot SQL should have.

The hierarchy can be organized by processing capabilities, physical capabilities, or some combination of both, and the importance of those capabilities can shift between tasks. For example, a task for quick toasting of bread could prioritize collaboration between robot A2 and robot B2, so that the forklift 2033 of robot A2 can quickly put bread in toaster function 3031. Squad leader robot SQL can be selected for direct communication with HOL assembly 20 due to its superior processing capabilities. But, an intense navigation sequence could require specialized processing capabilities and more physical maneuverability. Robot A1 can be prioritized to use caster wheels 2031 for difficult maneuvers and can replace squad leader robot SQL in the hierarchy because on-board processing in body 2011 is superior for simultaneous maneuverability processing and direct communication of the maneuverability processing with HOL assembly 20.

A calibration process can be implemented to determine the squad leader robot SQL. For example, a computationally intense task, such as navigating rough terrain can have a squad leader robot SQL with a combination of enhanced computational capabilities and appropriate navigational capabilities, such as continuous track propulsion (caterpillar treads 1031). The calibration process can include a test, such as a calculation of processing speed, to rank the robots by computational capabilities. Other factors, such as RAM, ROM, appendages, transmission and reception speeds, sensor capabilities, etc. can be ranked, also. Based on the importance of the factors, the squad leader robot SQL is selected to combine the computation capabilities factors with the other factors to result in the best squad leader robot SQL for the task. The calibration process can be implemented at a device associated with HOL assembly 20 or directly within the currently designated squad leader robot SQL. The remaining robots are likewise sorted in to teams, which can be layered, as needed. A task can be completed with all or fewer than all available squad members.

Figure 3:
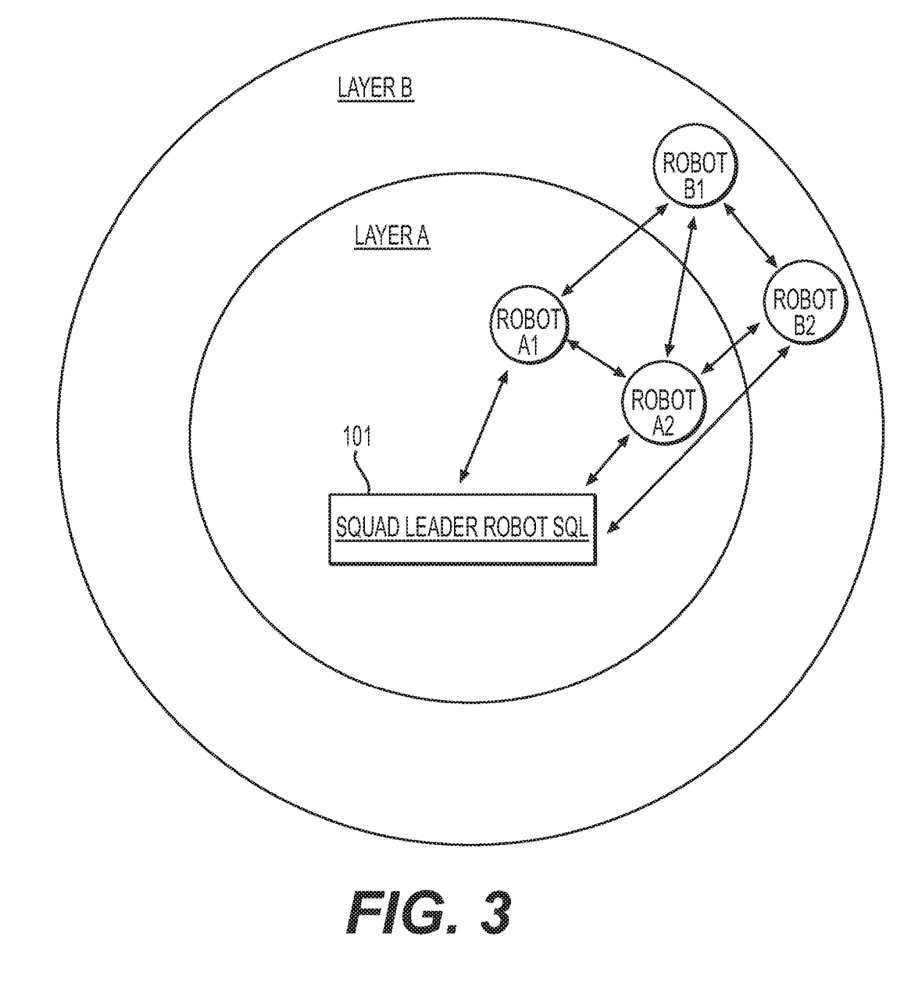
FIG. 3 is an example of a squad network hierarchy.

Layer A robots can be tasked with sensing terrain information and reporting terrain data back to squad leader. Layer B robots can be tasked with related support efforts, such as processing subroutines and reporting results back to squad leader robot SQL. Squad leader robot SQL updates and pushes mission directives, network mapping, and subroutine allocation based on the received sensed terrain data and the reported results. The hierarchy can be redistributed for a different task, such as a lift task, where armatures and hydraulics become a more important attribute. A robot of minimum processing capability becomes squad leader robot SQL, while teams and layer A and layer B robots are organized by the factors impacting their capability to support the lifting task. FIG. 3 illustrates an example of this layering. A perfect robot would be in the center of the circles, and in this example, they are ranked relatively and in relation to one another. Bi-directional arrows indicates the ability for the robots to shift within the hierarchy to other locations of different rank. So, processing the received first data can comprise determining that the subordinate robot is not physically capable of performing the first task. The methods herein can further comprise one of reassigning the first task to the lead robot and broadcasting a task support signal seeking task support from a second subordinate robot.

Figure 4B:
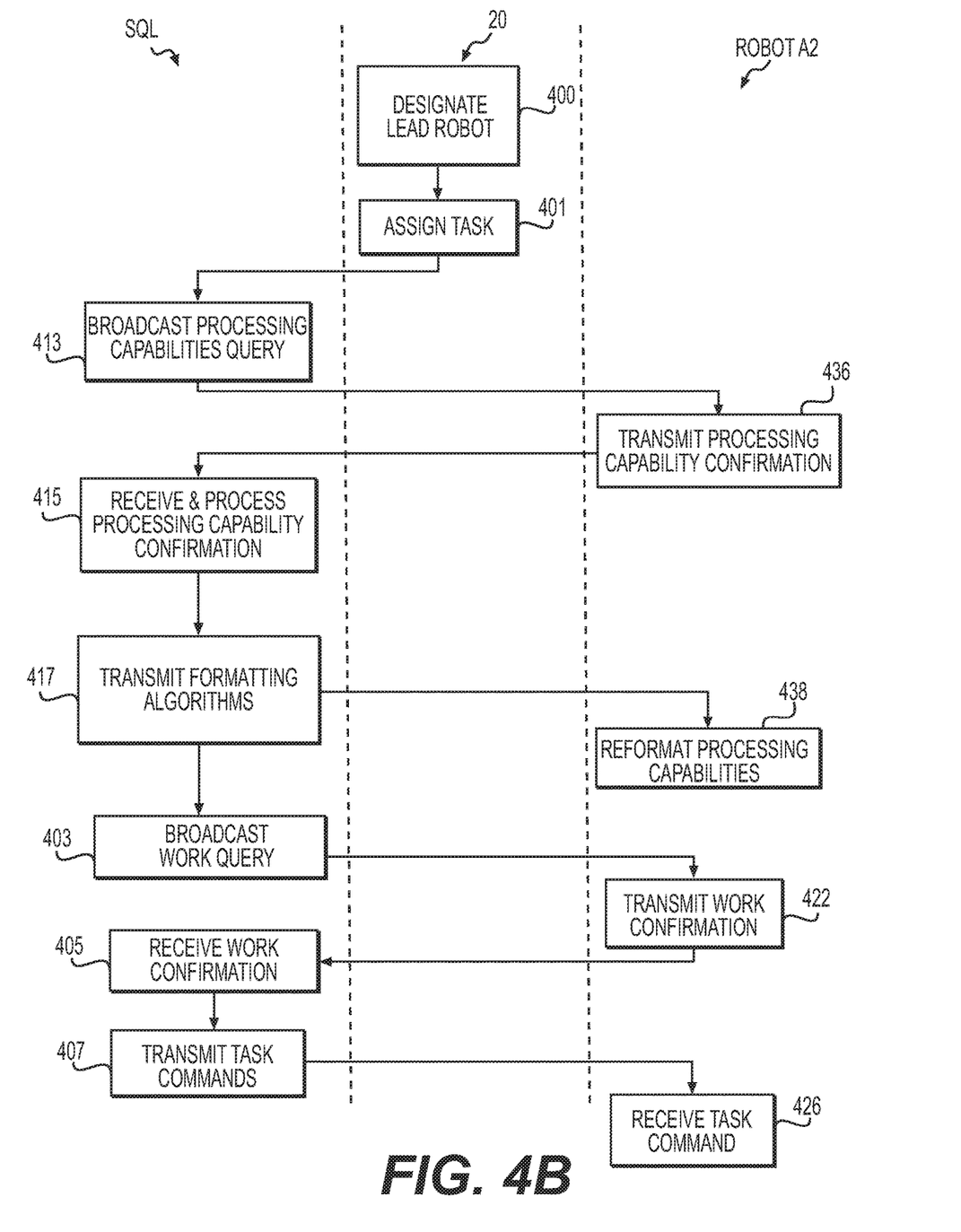

FIG. 4B illustrates a method conducive to the hierarchy establishment process. Here, robotic collaboration comprises the same steps of designating a first robot a lead robot in step 400 and assigning a first task in a task area to the lead robot in step 401. However, in step 413, the lead robot broadcasts a processing capabilities query in the task area to seek processing capabilities of a subordinate robot in the task area 100. The subordinate robot, robot A2 for purposes of this example, receives the broadcast processing capabilities query and in response, assembles and transmits a processing capability confirmation signal in step 436. Assembling by the subordinate robots can comprise a robot actively scanning its capabilities, or can comprise mere processing of preprogrammed signal content. Active scanning can be necessary because of the ability for HOL assembly 20 or squad leader robot SQL to push new algorithms and allocations down to robot A2. Or, robot A2 can have capabilities to reallocate or utilize processing capabilities on its own. So, real-time assessment of processing capabilities is preferred.

The lead robot receives and processes the processing capabilities confirmation signal from the subordinate robot in the task area in step 415. This informs the lead robot of subordinate robot processing characteristics.

An optional step 417 can comprise transmitting formatting algorithms from the lead robot to the subordinate robot. These algorithms can be received by the subordinate robot, and the subordinate robot can obtain reformatted processing capabilities in step 438. The algorithms from squad leader robot SQL can be formulated and issued directly from squad leader robot SQL, or HOL assembly 20 can push such algorithms to squad leader robot SQL or to subordinate robot A2. A forced reformatting can occur, or subordinate robot A2 can perform a run functionality on the received reformatting algorithms. Transmitting the formatting algorithms from the lead robot to the subordinate robot in response to the processing capabilities confirmation signal can comprise the formatting algorithms configured to format the processing capabilities of the subordinate robot to complete the first task.

With the subordinate robot A2 reformatted to complete all or some portion of the assigned task, the lead robot broadcasts a work query to the subordinate robot in step 403. The remaining steps progress as above in the method of FIG. 4A. In FIGS. 4A & 4B, the transmissions are shown to cross over HOL assembly 20, because the processing and communications of the squad leader robot SQL and subordinate robot A2 are monitored by a human on the loop.

The reformatting process can be based, at least in part, on a calibration process. In order to implement the calibration process, it is ideal to have a universal decoder device on each robot. It is also ideal to have an on-board wireless server architecture. In the absence of a shared programming language or shared transmission frequency, the universal decoder device can be implanted on a robot. The device would scan the robot for the extent of its capabilities for ranking in the network. The results of the scan would revert back to squad leader for a determination of which subroutines to push. As an example, the universal decoder could comprise at least a transceiver to communicate with squad leader, a processor and a stored scan routine. The universal decoder could transmit commands to the robot either by linking with the remote control capabilities of the robot (eg.: WIFI, 802.11, radio frequency) or directly via hardwire. The commands cause the robot to act, such as by activating hydraulics, performing a computation, etc. When hardwired, the universal decoder senses the robot response directly. It is also possible to have an optical scanner or motion sensor observe robot actions and report calibration information back over the network for further processing. Such observations can also be used to customize subroutine scripts, such as by informing squad leader of how to direct a robot to turn, lift, compute, etc. As the robot's various channels and lines are scanned, the related observation informs squad leader robot SQL of the channels and lines used to facilitate the task. Ultimately, squad leader robot SQL can customize instructions given to each subordinate robot so that each subordinate robot can have a unique subroutine that optimizes their contribution to the team. Commands can issue directly to the subordinate robots in the squad network or through remote control devices affiliated with the robots. In this way, robots of different manufacture or with different appendages can be allocated optimal subroutines to perform a lifting task. Despite disparate appendages, their team effort completes a task. The universal decoder device can include port, address, or signal assignments to differentiate, or "name," the robots A1, A2, B1, B2, . . . and thus permit tailored communications to each robot.

Figure 5:
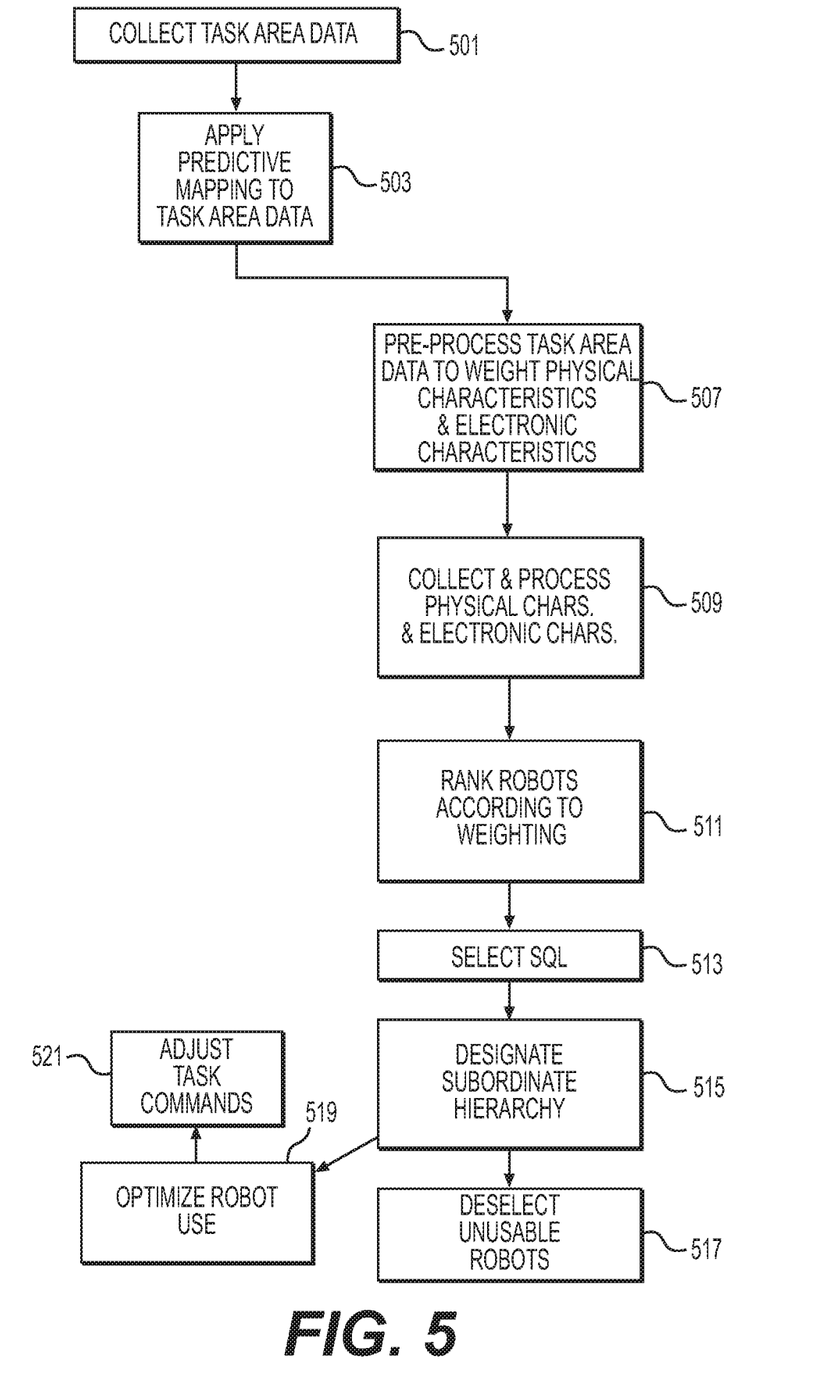
FIG. 5 is a method for forming a squad network and squad network hierarchy.

FIG. 5 outlines a method for processing collected task area data to optimize robot use. The method is usable to form a squad network and squad network hierarchy. In step 501, task area data is collected. The task area data can comprise many alternative aspects, such as terrain roughness, temperature, grade, wetness, obstacles, or other task impediments or task variables. Wireless signal strength for maintaining contact with HOL assembly 20 can also be assessed. Squad network members and locations thereof can be assessed. These examples are non-limiting in that additional task area data can be collected and processed compatibly with the principles of the invention disclosed herein.

In step 503, predictive mapping is applied to the task area data 503. Predictive mapping can comprise several aspects, but is useful so that assigning a first task in a task area to the lead robot comprises pre-processing task area data and predictive-mapping a sequence of subroutines necessary to complete the first task. Also, the method can comprise collecting and processing additional task area data and iteratively adjusting the sequence of subroutines necessary to complete the first task as the lead robot completes at least a portion of the first task.

To maintain physical task cohesion, robots can be reassigned based on level of responsiveness or appendage capability. Actions and subroutines can be reassigned as needed to keep task cohesion. In this regard, communication redundancy and reliability is managed across the network. Communication is a result of the task, not just the result of a task input. That is, the system has more robust capability than a mere push of information from squad leader robot SQL to the squad members in the network. This facet is augmented by cross-communication among the squad members. A lack of responsiveness or a lack of communication from a squad member robot or squad leader robot SQL results in reallocation of the squad members.

The adaptive nature of the squad network surpasses the capability of a clone network, as the squad network can comprise a heterogeneous network of disparate robots. While clones are permitted, disparate robots can be incorporated.

Subroutines stored among the network permit robots to observe each other. The robots can spontaneously, or with squad leader permission, assist another robot. Robots can also be programmed via subroutine to automatically adjust their activities based on their observations of other robots. Reporting back and responding to updated commands can also be implemented among the squad.

When orchestrating tasks, it is possible for the squad leader to hold all subroutines and distribute them to followers to sequence completion of a task. Alternatively, subroutines can be pushed among the network in advance, with control commands to sequentially activate subroutines based on network observations. In the distribution scheme, squad members can have reduced ROM and or RAM capabilities because squad leader robot SQL banks subroutines for push on an as-needed basis. When a task is completed, data can be collected for learning, updating, process improvement, etc., and then the squad can "unlearn" the task to make room in the ROM or RAM for a next task. Using this schema, pushes of subroutines are not mere upgrades of onboard data, but new task commands. By holding back distribution or activation of subroutines until implementation is needed, the squad network experiences faster reaction time and greater responsiveness because the squad network is not busy processing noncritical subroutines. Hold-back also permits the squad leader robot SQL to adjust the squad network in real time, as by reassigning tasks, moving robots between layers A and B, augmenting a team with a new robot, etc. As circumstances change, the squad can change, but the squad network's exposure to "too much information" is limited, which streamlines processing and leaves less programming subject to security breach, corruption, etc.

To further enhance squad leader robot SQL capability, it is possible to enable run-time composability of machine instructions. That is, squad leader robot SQL updates subroutine instructions based on collected data. This differs from prior systems that use mere lookup or if-then coding to pull pre-written code or to push down programming. Squad leader robot SQL can write new script or adjust existing script for unique circumstances. A task with given priorities has linked processes and attributes. As data collects to adjust the attributes, the processes adjust to complete the task. Squad leader robot SQL distributes the scripts in response to the network conditions.

Figure 6:
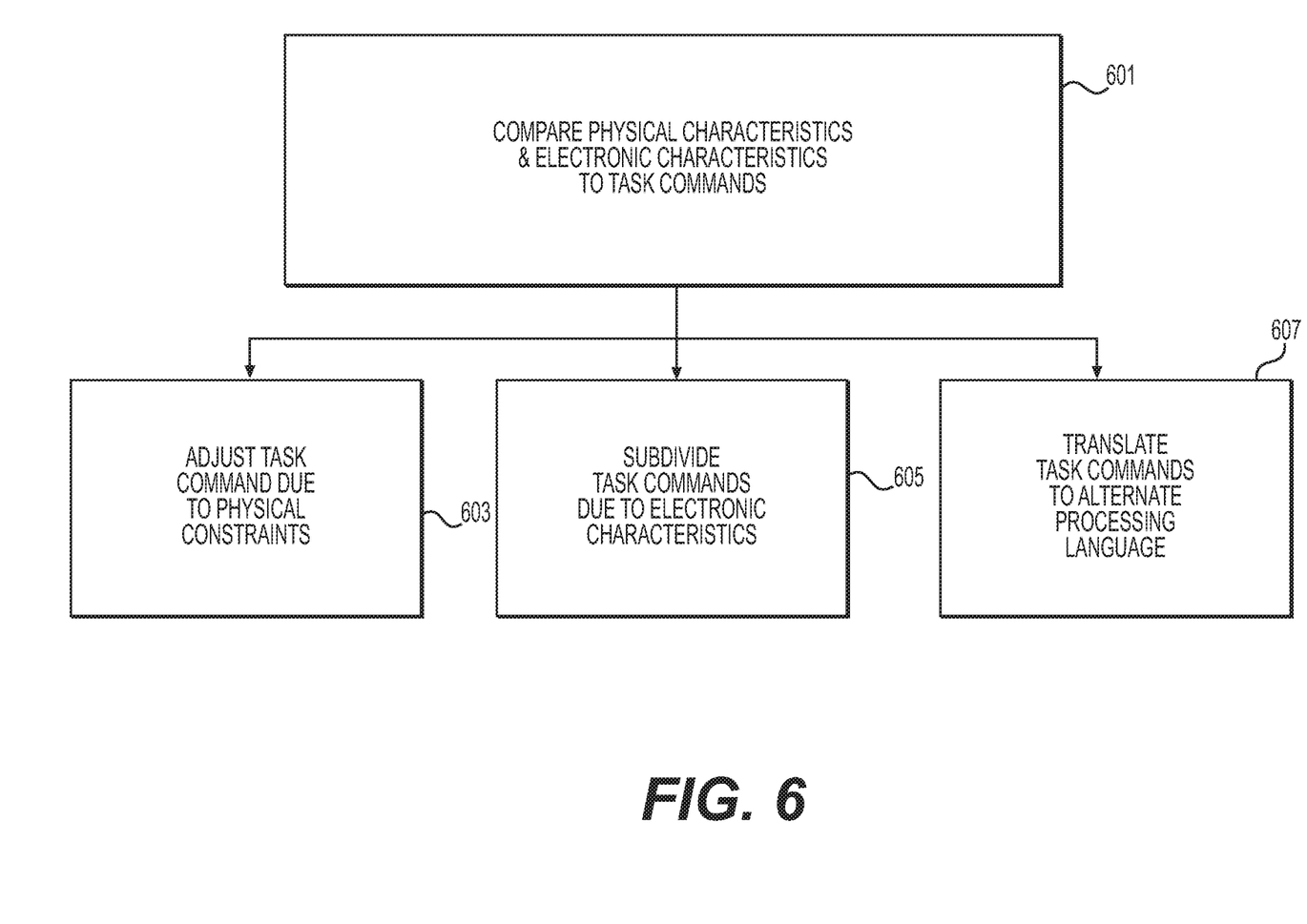
FIG. 6 is a method for optimizing robot use.
Figure 7:
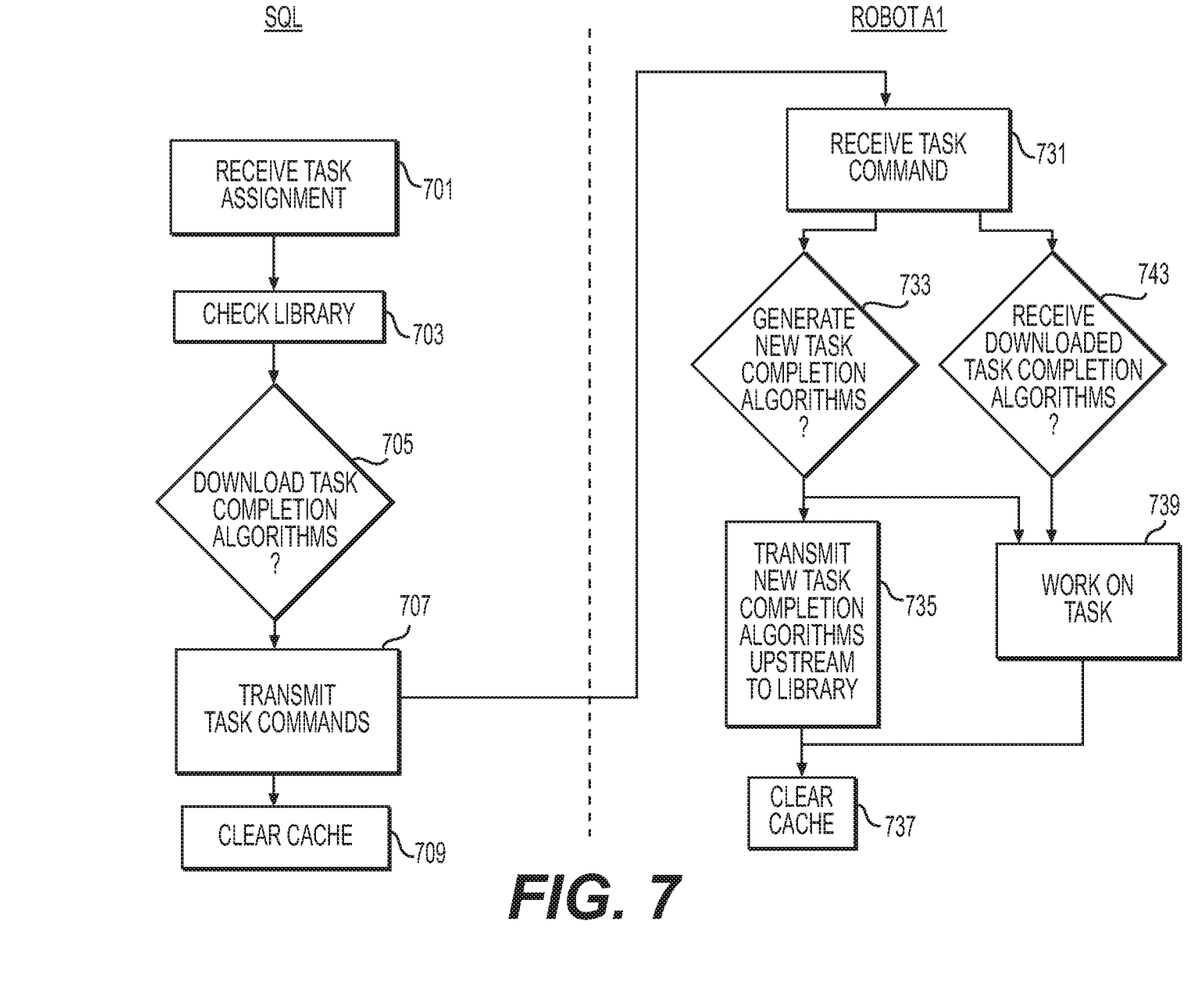
FIG. 7 is a method related to task completion algorithms.

These concepts are part of FIGS. 5-7. As above, the squad members report gathered intelligence, which can be part of collecting task area data in step 501. Eventually, the collected task area data results in optimizing robot use, which can be further broken down by the alternative steps laid out in FIG. 6. The squad members are capable of fused operational processing. The squad leader robot SQL collects the intelligence and processes it. In step 601, it is possible for squad leader robot SQL to compare physical characteristics and electronic characteristics to the task commands necessary to complete a task. The task commands can be based, as least in part, on the collected task area data. It may be necessary to adjust task commands due to physical constraints in step 603. Or, to subdivide task commands due to electronic characteristics in step 605. Or, to translate task commands to alternative processing languages in step 607. Steps 603, 605, 607 can be used together in parallel, or separately, as needed.

As one example for applying step 603, the above reallocation outlined above whereby robot A2 is replaced by robot A1 based on maneuvering difficulty. The caterpillar treads 2032 of robot A2 constrain its maneuverability, while the caster wheels 2031 of robot A1 have advantageous maneuverability.

For an example of applying step 605, a subordinate robot A1 can determine that it takes 75% power to complete a task. This electronic characteristic of robot A1 indicates that it is beneficial to restrict the task given to robot A1 to conserve power. Distributing the task can preserve the power of robot A1. But, fused processing permits squad leader robot SQL to redistribute the task commands to other squad members, but likewise to prevent 75% power depletion in the other squad members. So, the squad leader robot SQL can distribute subroutines of divided task commands set to 75% power to restrict processing efforts by other squad members. This reduces the time the squad network spends processing and fuses the relative processing efforts of the squad members. Dynamically programming the subroutines and fusing real-time data yields the fused operational processing of squad leader robot SQL.

Because of the calibration scheme above, further dynamic processing permits squad leader robot SQL to translate the exemplary 75% power effort according to each subordinate robot's capabilities. For example, making toast with robot A2, a robot with a greater lift capacity than the others, this robot would expend less power that the robot that detected a 75% power effort. So, the subroutine for the stronger robot would adjust so that the stronger robot expends the equivalent of 75% of the detecting robot power.

As an example of step 607, robot A1 can comprise a different processing language than robot A2. So, if robot A1 were to replace robot A2 on the task, the task commands for robot A2 would need to be translated to robot A1's processing language.

Turning now to FIG. 7, as squad members detect information and report it back, the discovered data can be used to update a library of subroutines. The library can be stored in the cloud instead of on squad leader robot SQL to simplify the contents of the squad leader robot. A lookup routine can access the library from the cloud, and squad leader robot SQL could push, or adjust and push, the subroutine as needed for the circumstances.

So, squad leader robot SQL could receive a task assignment in step 701 and check library 10 in step 703. If available, a task completion algorithm can be downloaded in response to decision block 705, but if one is not available, it cannot be downloaded. Squad leader robot still has the task commands and transmits them, with or without downloaded task completion algorithms, in step 707. Squad leader robot SQL can then clear its cache in its memory device with respect to those task commands in step 709, because the task commands are issued to subordinate robot A1. This frees up squad leader robot A1 for other tasks. Alternatively, the task commands can remain in the memory device cache until a confirmation signal is received from robot A1.

Because of the limited on-board capabilities of the squad members and squad leader robots, it is possible to implement a decision tree for whether to report information back to the squad leader robot SQL or to HOL assembly 20, or whether to implement processing to independently adjust subroutines. For example, a squad member can follow a decision tree for whether to perform a calculation or whether to ping squad leader robot SQL to push a result back. In another example, squad leader robot SQL could follow a decision tree whether to write new script, whether to modify existing scripts, or whether to ping HOL assembly 20 to pull down a script from a library 10. A decision tree is one example of real time robot determination of processor allocation.

FIG. 7 illustrates one such decision tree. Once subordinate robot A1 receives the task command from squad leader robot SQL in step 731, the subordinate robot decides whether to generate new task completion algorithms to complete the commanded task in decision block 733 or whether to receive downloaded task completion algorithms in decision block 743. If the subordinate robot receives task completion algorithms to accomplish the commanded tasks, then the robot A1 can work on the task in step 739. Even with received downloaded task completion algorithms, subordinate robot A1 could determine a more efficient process can be implemented based on an analysis, such a feedforward processing subroutine, or based on an aspect of collected task area data. And, if no downloaded algorithms are present, then subordinate robot can generate new task completion algorithms from scratch.

For example, the terrain may comprise collected task area data indicating that a grade is present. It could consume less power to go up the grade backwards than to go up forwards, so, based on the collected task area data, the subordinate robot A1 can generate an algorithm to modify the received downloaded task completion algorithm to require that robot A1 go up the grade backwards. Or, newly generated algorithms can be so created to result in subordinate robot working on the commanded task in step 739.

Having worked out a more efficient way to traverse the terrain in the task area 100, the modified or newly generated task completion algorithm can be transmitted to a library 10 for use by the robot comprising physical characteristics the same or similar to robot A1. With the task completion algorithm stored, robot A1 can clear its cache of the algorithm after working on the commanded task.

This can be accomplished, for example, by determining that the subordinate robot comprises sufficient processing capabilities to compose task completion algorithms. The subordinate robot can then compose task completion algorithms and transmit the composed task completion algorithms from the subordinate robot to the lead robot. The lead robot can forward the task completion algorithms to a remote library source. Then, the composed task completion algorithms can be deleted from the subordinate robot and from the lead robot.

Human-on-the-Loop (HOL) systems are desired for permitting activities such as squad oversight, real-time adjustment to tasks and priorities, manual overrides, real-time review of collected data, etc. Thus, the above tasks performed by squad leader robot SQL can be augmented by human intervention. Returning to FIGS. 1 & 2, wireless connectivity to a server 40, 43, cloud 30, and HOL assembly 20 computing capability permits human intervention and oversity. Server can 40 connect the cloud 30 to the computing capability and to libraries 10 of stored algorithms, including scripts and subroutines. It is to be understood that more or less connectivity can be implemented, for example, using router, tower, telco closet, transceivers, etc.

A user using the HOL assembly 20 can write new subroutines or select subroutines for push to squad leader robot SQL. The HOL computing capability can comprise hardware, storage devices and programming to support squad task completion; and appropriate inputs, outputs, & displays permit user interaction.

Banks of processors can preprocess collected information to determine predictive mapping of outcomes. By performing discrete run-aheads of possible subroutines, it is possible to review whether the subroutines are any good. It is also possible to check whether the task area that the squad is in is correctly represented in the HOL assembly 20. It is also possible to discover or adjust optimization points that are outcome-determinative.

The outcomes can be reviewed by the user and desired outcomes can be selected for implementation by the squad network. Implementation can occur by one or more of adjusting tasks, adjusting priorities, adjusting arguments, or adjusting attributes of the tasks. The HOL user can write new subroutines. Or, the subroutines can auto-adjust based on the adjusted tasks, priorities, arguments, or attributes; the auto-adjustment can occur, for example, by export of supporting code in support of the adjustments. This strategy supports the task completion, as a task with given priorities has linked processes and attributes. As data collects to adjust the attributes, the processes adjust to complete the task.

Instead of each squad member running pre-processing, either the squad leader robot SQL or the HOL assembly 20 or a subset of high processing capacity squad members (which can include only a single squad member) is allocated the processing task. This permits flexibility to allocate burden to the cloud or to the squad members. While a computationally strong squad could handle the allocation, the strategy avoids having each squad member running predictive mapping to determine its next step. Thus, low computational performers can perform complex tasks by sequential feed of optimized subroutines.

The predictive mapping assists with calibration and allocation of team members, as it permits processing to determine which significant interactions give the best task results. Predictive mapping permits the HOL assembly 20 or squad leader robot SQL to determine which pairings of robots give the most significant results.

These preceding predictive mapping techniques can be part of step 503 for applying predictive mapping to task area data. In support of the desired outcome, the task area data can be pre-processed also to weight physical characteristics and electronic characteristics in step 507. Referring back to the above examples, when making toast, toaster function 2031 can have a high weight. But a computationally intense task gives toaster function 2031 zero weight while giving processing speed X a high weight.

In step 509, the physical characteristics and electronic characteristics of the squad network in the task area 100 are collected and processed. In step 511, the robots in the squad network are ranked according to the weights assigned in step 507. So, robot B1 is ranked high for its physical characteristic 3031 for the commanded task of making toast, but having a lower processing capacity, than robots A1 & A2, robot B1 is ranked lower for a computationally intense processing task.

In step 513, squad leader robot SQL is selected. In the illustration the best robot for processing capabilities is selected as squad leader robot SQL. However, an alternative squad leader robot can be selected based on meeting minimum criteria, leaving the stronger robot available for other commanded tasks. For example, when making toast, the illustrated squad leader robot SQL can be excluded in favor of robot A2, robot A2 having adequate processing capabilities to convey bread to the toaster function 3031.

In step 515, the subordinate hierarchy is designated. Robots with a high weight for a task can be designated layer A robots while robots of little contributive value are designated layer B robots. In the toast example, toaster could be upgraded to layer A while robot A1 is demoted to layer B. For computationally intense processing, the hierarchy can remain as illustrated. Additionally, a squad leader robot SQL can work with as many robots as necessary to complete a task. So, a first subordinate robot can perform a portion of the commanded task while a second subordinate robot performs another portion of the task.

As another example of designating a subordinate hierarchy, it is possible to select a squad leader robot SQL and then allocate some of the squad leader functionality to a layer A robot so that a layer A robot is allocated some of the oversity of a squad leader robot. So, the lead robot can receive a work confirmation signal from a first subordinate robot, for example, robot A1, and also from a second subordinate robot A2 in the task area 100. The lead robot transmits the task command to the second subordinate robot A2. The lead robot receives a task confirmation signal from the second subordinate robot A2, and the task confirmation signal from the second subordinate robot A2 is processed to confirm whether the subordinate robot can collaborate with the lead robot and the first subordinate robot A1 to do the first task. Then, it is possible to compare the processed received first data and the processed received second data from the first subordinate robot A1 to the received task confirmation signal from the second subordinate robot A2. It is then possible to determine relative task completion capabilities between the first subordinate robot A1 and the second subordinate robot A2. Then, it is possible to subdivide the task command in to first task commands and second task commands to allocate robotic collaboration based on the determined relative task completion capabilities.

With the hierarchy in place, it is possible to advance the first subordinate robot A1 to lead robot status for purposes of issuing subordinate task commands after determining the relative task completion capabilities. Then, the second subordinate robot A2 can be assigned to receive and execute subordinate task commands issued by the first subordinate robot A1.

In step 517, it is possible to deselect unusable robots and exclude them from the squad members altogether. For the example of moving on a grade, robot B1, having no capacity to maneuver, can be excluded from participating in the commanded task. Or, following the first subordinate robot and second subordinate robot example, it is possible to one of deactivate the lead robot, demote the lead robot to a lower layer, or assign the lead robot to a new task.

Step 519 can proceed after step 515 to result in optimal robot use, each squad member being used at an optimal capacity. By way of the processing capabilities example, an example for implementing step 519 can comprise subdividing the first task in to a sequence of sub-tasks. The sequence of sub-tasks can be optimized to maximize use of lead robot, subordinate robot and second subordinate robot aggregated processing capabilities. So, parallel processing tasks assigned to a robot with optimal attributes for such, and serial processing tasks assigned to a robot with optimal attributes for such. But, to avoid impacting other attributes of the subordinate robots, it is possible to minimize the impact on aggregated storage device capabilities of the subordinate robot and second subordinate robot. This helps the subordinate robots run faster and maintain high storage device capabilities. So, it is possible to sequentially transmit the sequence of sub-tasks for parallel or serial processing, so as not to unnecessarily fill the respective storage devices of the subordinate robots.

In order to make the tasks feasible to the processing capabilities of the squad members, it can be necessary to adjust the task commands in step 521. This can comprise a step of subdividing the first task in to a sequence of sub-tasks, the sequence of sub-tasks optimized to maximize use of subordinate robot electronic characteristics. Transmitting the task command to such a subordinate robot can comprise sequentially transmitting the sequence of sub-tasks.

Or, step 521 can comprise subdividing the first task in to a sequence of sub-tasks, the sequence of sub-tasks optimized to maximize use of subordinate robot processing capabilities, transmit signal profile, and receive signal profile, while minimizing impact on subordinate robot storage device capabilities. Transmitting the task command can again comprise sequentially transmitting the sequence of sub-tasks.

Or, step 521 can comprise determining that the subordinate robot does not comprise sufficient storage device capabilities to store algorithms for completing the first task, and so adjusting task commands comprises downloading task completion algorithms from a remote library source to the lead robot, and streaming the task completion algorithms from the lead robot to the subordinate robot.

In a complex system, it is possible to implement multiple regressions to study combinations of robots to select the best combination of robots. The complexity can be allocated to processors in the cloud or to the HOL. The simulations can be stored in the library or elsewhere in the cloud and can be accessed before task allocation, or dynamically during subroutine allocation, to determine next steps for the squad.

The squad leader robot SQL—to cloud—to HOL assembly 20 architecture permits the real-time building of decision engine software and supports the cohesive use of:

Virtual mapping of robot locations, actions, and situations;

CAVP process validation (Calibration and Validation Process for Complex Adaptive Simulations Systems);

Virtual mapping from sensors to systems;

Augmented reality of multiple real and virtual systems interacting with real and virtual obstacles as a comprehensive team;

Discrete what-if analysis tools;

Cognitive decision making process for rapid decisions that are forensically traceable;

Off-platform cloud processing banks for decision support;

Communication envelopes that self-heal and self-organize to build LAN networks;

Constant run ahead decision making to determine best formations and team compositions; and Viewable data collection with selective data feed.

Squad adjustments can comprise, for example:

Robots capable of automatically detecting each other and adapting workflow to account for new members, situations or human leadership;

Team machine behaviors that allow team lift, team formation changes, and team push; and Disciplined, responsive, autonomous team-task capable networks of various types of robots.

Customary programming languages, such as C+ within a Visual Studio Integrated Development Environment, can be used to implement the network. With the use of the universal decoder device, squad leader robot SQL and the HOL assembly 20 an "learn" the robot operating language and thus interact with any host of microcontrollers, such as Arduino, Raspberry Pi, etc. The HOL assembly 20 or squad leader robot SQL can be equipped with multiple transceiver types, or multiple squad leader robots can be appointed to aggregate the necessary connectivity to the HOL assembly 20 so that a variety of network connections can interface with a single squad network. For example, network connectivity can be to one or more of wireless LANs, XBee 1 or 2 wireless communications devices, 2.4 gHz 802.11G communications.

One aspect of robot communication within the squad network requires permission from a robot to participate in the squad network. For example, even though an airplane is capable of communicating with the squad due to its network connectivity, the squad leader robot SQL can refuse communication with the airplane. Alternatively, even if pinged by squad leader robot SQL to participate in the squad network, the airplane would have to grant permission to participate, as by human interaction or as by pre-coding in the airplane's system software.

Thus, in the absence of a universal decoder device in a foreign robot, it is possible to implement a calibration process where a squad leader robot or a tasked squad member sends a signal to a foreign robot, with scanning of possible signals to find the correct transmission signal. The squad leader robot SQL or tasked squad member can observe results, such as responses by the foreign robot and transmit the observation to the cloud for further processing. A subroutine can be built to download to squad leader root SQL to control the foreign robot to complete the task.

Preferably, a squad network and its available and actual participants would have its own communication protocol with interaction on a shared communication line. Once connected to a squad network, a robot would transmit location data for receipt and processing by squad leader robot SQL or HOL assembly 20, and a subroutine would be pushed to the robot for movement control. Subroutine pushes to a squad member can be synchronized or threaded, as necessary.

Other implementations will be apparent to those skilled in the art from consideration of the specification and practice of the examples disclosed herein.

What is claimed is:

1. A method of robotic collaboration, comprising:
    assigning a task in a task area;
    applying a calibration process to a group of robots to rank the group of robots by one or both of computational capability or physical capability required to complete the assigned task;
    designating one or more robot of the group of robots as leader robot;
    designating one or more robot of the group of robots as subordinate robot;
    collecting task area data at the one or more leader robot;
    applying, by the one or more leader robot, a predictive mapping to the collected task area data to create a sequence of subroutines needed to complete the assigned task, the predictive mapping comprising a run-ahead processing of the sequence of subroutines to determine outcome-determinative optimization points of the task; and
    composing, by the one or more leader robot, a subroutine allocation to direct the one or more subordinate robot and the one or more leader robot to complete the assigned task;
    wherein the subroutine allocation results in heterogenous subroutines being allocated such that the one or more leader robot completes different aspects of the assigned task than aspects of the assigned task completed by the one or more subordinate robot.

2. The method of claim 1, wherein the group of robots are heterogenous, and wherein the one or more leader robot comprises at least the computational capability or physical capability to complete the assigned task.

3. The method of claim 1, wherein the group of robots are homogenous, and wherein more than one leader robots are aggregated until the leader robots comprise at least the computational capability or physical capability to complete the task.

4. The method of claim 1, wherein more than one leader robots are aggregated until the leader robots comprise at least the computational capability or physical capability to complete the task.

5. The method of claim 1, wherein at least some robots of the group of robots are homogenous in computational capability or physical capability, yet less than all of the homogenous robots are designated as a leader robot.

6. The method of claim 1, wherein the one or more subordinate robot collects updated task area data and observational data of performance of the group of robots while completing the assigned task and forwards the updated task area data and observational data of performance of the group of robots to the one or more leader robot, and wherein the one or more leader robot processes the forwarded updated task area data and observational data of performance of the group of robots and applies an updated subroutine allocation.

7. The method of claim 6, wherein applying a subroutine allocation to complete the assigned task comprises the one or more leader robot holding-back subroutines until the updated task area data is collected and processed.

8. The method of claim 1, wherein the one or more subordinate robot collects updated task area data while completing the assigned task, processes the updated task area data, and modifies the allocated subroutine responsive to the updated task area data to complete the aspect of the assigned task.

9. The method of claim 1, comprising implementing a cross-communication routine comprising monitoring, by the one or more leader robots, the one or more subordinate robots for report-back data, and reallocating the subroutine allocation in the absence of report-back data from one or more subordinate robots.

10. The method of claim 1, comprising applying a processing capabilities subroutine to determine the computational capabilities of the one or more subordinate robot, and wherein applying a subroutine allocation to complete the assigned task comprises the one or more leader robot sequentially feeding subroutines to the one or more subordinate robot, the sequentially fed subroutines optimized to the determined computational capabilities of the one or more subordinate robot.

11. The method of claim 10, wherein more than one subordinate robots are heterogenous as to computational capabilities such that the size of the respective subroutines sequentially fed to the respective more than one subordinate robots varies.

12. The method of claim 1, comprising applying a processing capabilities subroutine to determine the computational capabilities of the one or more subordinate robot, and wherein applying a subroutine allocation to complete the assigned task comprises the one or more leader robot subdividing the first task into a sequence of subtasks and sequentially feeding the subtasks to the one or more subordinate robot.

13. The method of claim 1, wherein applying a calibration process to complete the task comprises selecting a computational capability or physical capability most needed to complete the task; and ranking the group of robots into a hierarchy of capacity to satisfy the selected most needed computational capability or physical capability.

14. The method of claim 13, wherein the hierarchy of capacity dictates the designation of the one or more leader robot and the designation of the one or more subordinate robot such that the one or more robots comprising the most needed computational capability or physical capability is designated as leader robot while the one or more robots comprising less needed computational capability or physical capability are designated as subordinate robot.

15. The method of claim 14, wherein:
the one or more subordinate robot collects updated task area data while completing the assigned task and forwards the updated task area data to the one or more leader robot;
the one or more leader robot:
processes the forwarded updated task area data;
applies a calibration process to select an updated computational capability or physical capability most needed to complete the task in light of the updated task area data; and
applies an updated subroutine allocation responsive to the forwarded updated task area data; and
when the updated task area data indicates a change in the computational capability or physical capability most needed to complete the task in light of the updated task area data, the updated subroutine allocation comprises the demotion of the one or more leader robot to subordinate robot and the promotion of one or more subordinate robot to leader robot.

16. A method of robotic collaboration, comprising:
assigning a task in a task area;
applying a calibration process to a group of robots to rank the group of robots by one or both of computational capability or physical capability required to complete the assigned task, wherein applying a calibration process to complete the task comprises:
selecting a computational capability or physical capability most needed to complete the task; and
ranking the group of robots into a hierarchy of capacity to satisfy the selected most needed computational capability or physical capability;
applying the ranking to designate a robot of the group of robots as leader robot;
applying the ranking to designate a robot of the group of robots as subordinate robot;
deploying the leader robot and subordinate robot in the task area;
collecting task area data in the task area, the leader robot collecting a subset of task area data and the subordinate collecting a second subset of task area data and forwarding the second subset of task area data to the leader robot;
processing, by the leader robot, the collected task area data to create a sequence of subroutines needed to complete the assigned task; and
composing and applying, by the leader robot, a subroutine allocation to direct the subordinate robot to complete the assigned task.

17. The method of claim 16, wherein the subroutine allocation results in heterogenous subroutines being allocated such that the leader robot completes different aspects of the assigned task than aspects of the assigned task completed by the subordinate robot.

18. The method of claim 16, wherein the hierarchy of capacity dictates the designation of the leader robot and the designation of the subordinate robot such that the robot of the group of robots comprising the most needed computational capability or physical capability is designated as leader robot while the robot of the group of robots comprising less needed computational capability or physical capability is designated as subordinate robot.

19. The method of claim 18, wherein:
the subordinate robot collects updated task area data while completing the assigned task and forwards the updated task area data to the leader robot;
the leader robot:
processes the forwarded updated task area data;
applies a calibration process to select an updated computational capability or physical capability most needed to complete the task in light of the updated task area data; and
applies an updated subroutine allocation responsive to the forwarded updated task area data; and
when the updated task area data indicates a change in the computational capability or physical capability most needed to complete the task in light of the updated task area data, the updated subroutine allocation comprises the demotion of the leader robot to subordinate robot and the promotion of subordinate robot to leader robot.

20. The method of claim 16, wherein applying a subroutine allocation to complete the assigned task comprises the leader robot subdividing the first task into a sequence of subtasks, selecting a set of subtasks for hold-back, and sequentially feeding the subtasks to the subordinate robot.

* * * * *